May 15, 1956 J. H. STRUBLE 2,745,674
VERTICALLY ADJUSTABLE WHEEL SUSPENSION MEANS
Filed March 29, 1955 2 Sheets-Sheet 2
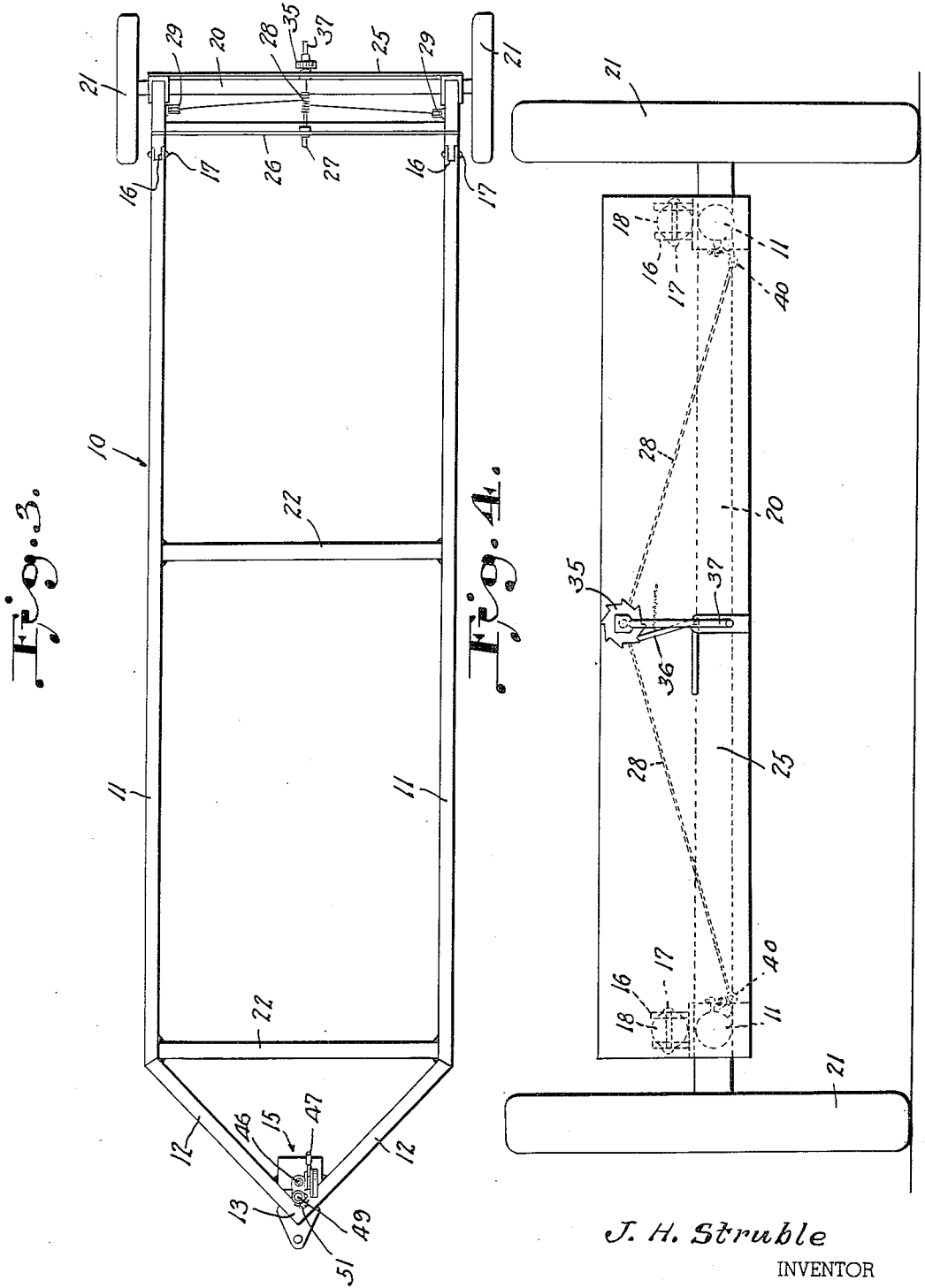
J. H. Struble
INVENTOR
BY *Cdsnowles.*
ATTORNEYS.

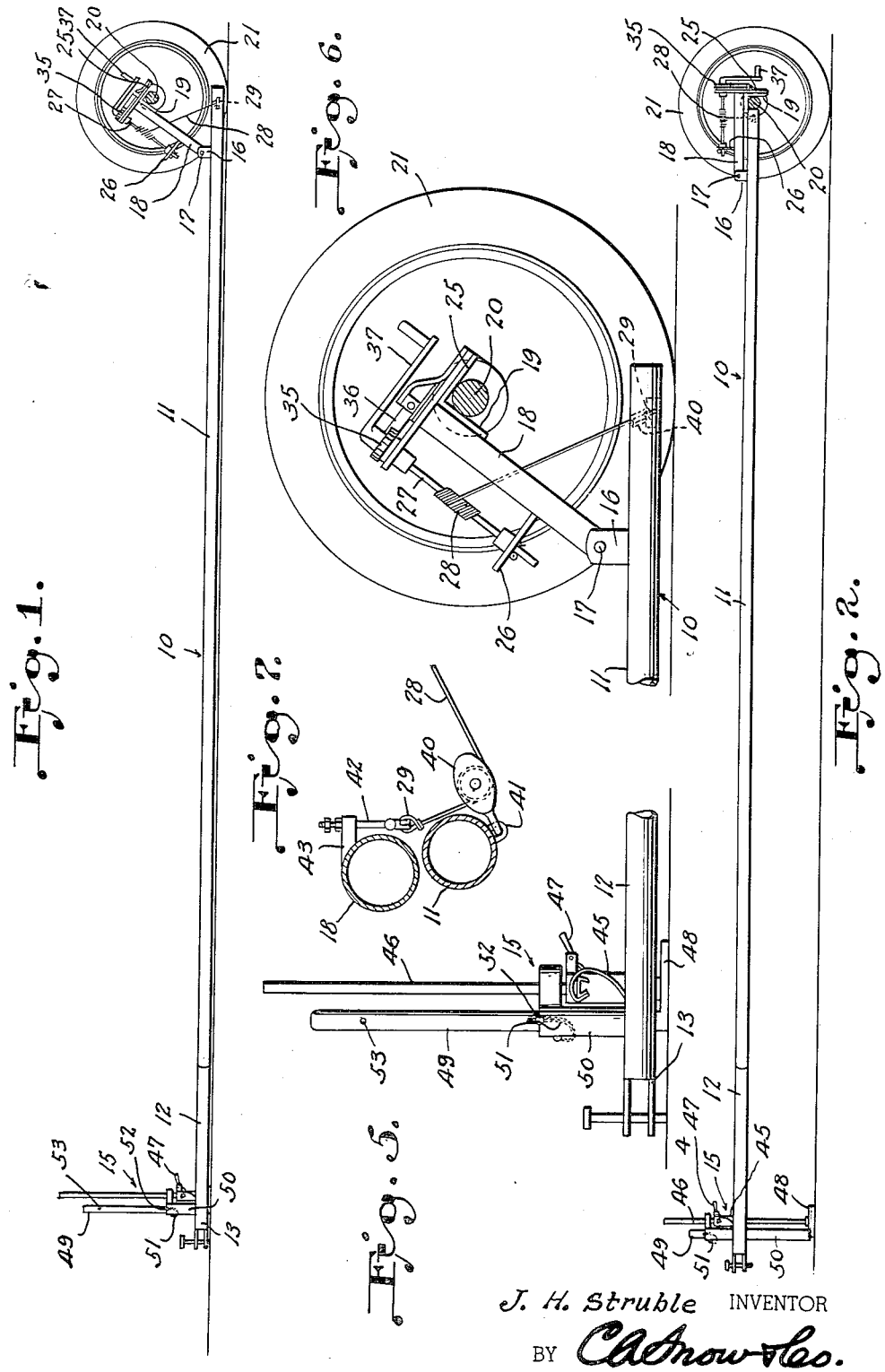

United States Patent Office 2,745,674
Patented May 15, 1956

2,745,674

VERTICALLY ADJUSTABLE WHEEL SUSPENSION MEANS

Joseph H. Struble, Caldwell, Kans.

Application March 29, 1955, Serial No. 497,704

1 Claim. (Cl. 280—44)

This invention relates to a trailer, and more particularly to such a vehicle for towing such loads as farm machinery, hay or the like, provided with means whereby the frame of the trailer may be lowered at both ends to a position flush with the ground, whereby to facilitate loading of the same, and subsequently elevated at both ends to a towing position.

An additional object of this invention is the provision of means including rear wheels for the trailer connected to the frame by means of a connection to the axle, provided with a pivoted member operated by a cable or the like, for raising the rear end, and provided with jack means at the front or towing end of the device, whereby such front end may be elevated for connection with the towing vehicle.

A further object of the invention is the provision of a device of this character which is sturdy and durable in construction, reliable and efficient in operation, and relatively simple and inexpensive to manufacture, assemble and utilize.

Still other objects reside in the combinations of elements, arrangements of parts, and features of construction, all as will be more fully pointed out hereinafter and disclosed in the accompanying drawings, wherein there is shown a preferred embodiment of the instant inventive concept.

In the drawings:

Figure 1 is a side elevational view of the device, partially broken away, showing the trailer in loading position.

Figure 2 is a view similar to Figure 1, but showing the device in towing position, Figure 3 is a top plan view of the trailer of the instant invention, Figure 4 is a rear elevational view of the device on an enlarged scale, certain concealed elements thereof being indicated in dotted lines, Figure 5 is an enlarged view of the jack mechanism as shown in Figure 1 and in the towing position thereof, Figure 6 is a view on the scale of Figure 5 disclosing a similar arrangement at the rear of the vehicle, and Figure 7 is an enlarged sectional view of a constructional detail.

Similar reference characters refer to similar parts throughout the several views of the drawing.

Having reference now to the drawing in detail, there is generally indicated at 10 a frame, comprised of oppositely disposed longitudinal supports 11, terminating at their forward end (see Figure 3) in intersecting diagonal members 12 which converge at 13 to support a jack structure generally indicated at 15, and to be more fully described hereinafter.

At the rear end of each of members 11, there are provided a pair of upstanding lugs 16, pivotally connected as by pivots 17 to links 18, which are in turn suitably secured to a channel iron 19 affixed to a rear axle 20 connecting a pair of rear wheels 21.

Transverse reinforcing bars 22 extend between the forward and intermediate portions of the frame 10 transversely thereto.

A transversely extending plate 25 is suitably secured to one flange of the channel iron 19, and a second plate 26 is secured transversely across an intermediate portion of the linking bars 18. At a suitable central position, a shaft 27 extends between the two plates 25 and 26 and is suitably journaled therein, and has surrounding an intermediate portion thereof a cable 28 or wire, the ends 29 of which are suitably secured in lugs attached to the rear ends of each of members 11. The shaft 27 is adapted to carry exteriorly of the plate 25 a ratchet 35, which is engaged by a pawl 36 secured to the frame, and the end of shaft 27 exteriorly of the plate 25 also carries a crank member 37 for rotation of the shaft, and hence contraction and extension of the cord 28 and corresponding raising and lowering of the frame members 11 due to the relative angular positioning of links 18 and axle 20 upon rotation about the pivots 17.

Figure 7 discloses a cable adjusting means wherein cable 28 passes through a pulley 40, the latter being connected to a bracket 41 on each of tubular members 11, and engages a screw threaded pin 42, connected to an extending flange 43 carried by each of members 18. Obviously, in this case suitable adjustment of the threaded member 42 will tension or loosen the cable as desired.

The opposite end of the vehicle is adapted to be raised or lowered by means of a jack 45, having a jack shaft 46, and the customary internal mechanism, adapted to be operated by a jack handle 47. The foot of the jack shaft 46 seats in the stirrup 48, carried by a guide support 49, the latter being contained in a tubular shaft 50. When the jack is elevated to a suitable position for towing the vehicle, a chain 51 and pin 52 connection is adapted to engage in a suitable aperture 53 in the shaft 50 to support the jack in an elevated position and hence, raise the apparatus to a suitable level for towing.

From the foregoing it will now be seen that there is herein provided an improved trailer apparatus including means whereby the same may be lowered to a substantially horizontal position level with the ground, and subsequently elevated to a corresponding position in horizontal relation for towing, which accomplishes all of the objects of this invention, and others, including many advantages of great practical utility and commercial importance.

As various embodiments may be made of this inventive concept, and as various modifications may be made in the embodiment hereinbefore shown and described, it is to be understood that all matter herein is to be interpreted merely as illustrative and not in a limiting sense.

I claim:

A vertically adjustable wheel suspension means, comprising an elongated frame formed of parallel side members, forward and intermediate connecting bars between said side bars, a jack at the forward end of said frame, a rear axle, wheels carried by said axle, an elongated plate fixed relative to said axle between said wheels, a pair of links fixed at one end thereof relative to said axle, means pivotally connecting the other ends of said links to said side bars forwardly of the rear ends of the latter, a winding shaft rotatably carried by said plate, a crank on one end of said shaft, a ratchet fixed on said shaft, a spring pressed pawl engaging said ratchet, a sheave carried by each side bar rearwardly of the connection of the links therewith, a pair of cables wound about said shaft and extended through said sheaves, and means securing the outer ends of said cables to said links, winding of said cables on said shaft raising the rear ends of said bars.

References Cited in the file of this patent

UNITED STATES PATENTS

| | | |
|---|---|---|
| 2,621,942 | Getz | Dec. 16, 1952 |
| 2,636,745 | Cartwright | Apr. 28, 1953 |